(12) United States Patent
Hassan et al.

(10) Patent No.: US 11,949,735 B2
(45) Date of Patent: Apr. 2, 2024

(54) CENTRALIZED APPROACH FOR MANAGING CROSS-SERVICE DATA OF CLOUD RESOURCES

(71) Applicant: Oracle International Corporation, Redwood Shores, CA (US)

(72) Inventors: Mohamed Saber Abdelfattah Hassan, Bellevue, WA (US); Jonathan Jorge Nadal, Seattle, WA (US); Nathaniel Martin Glass, Bellevue, WA (US); Yu Wu, Sammamish, WA (US); Daniel M. Vogel, Seattle, WA (US); Geoff Hopcraft, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 41 days.

(21) Appl. No.: 17/549,595

(22) Filed: Dec. 13, 2021

(65) Prior Publication Data

US 2022/0103616 A1    Mar. 31, 2022

Related U.S. Application Data

(63) Continuation of application No. 16/921,490, filed on Jul. 6, 2020, now Pat. No. 11,233,845.

(51) Int. Cl.
*G06F 15/16* (2006.01)
*G06F 9/46* (2006.01)
(Continued)

(52) U.S. Cl.
CPC ............... *H04L 67/10* (2013.01); *G06F 9/466* (2013.01); *G06F 9/50* (2013.01); *G06F 16/951* (2019.01); *H04L 47/10* (2013.01); *H04L 47/70* (2013.01)

(58) Field of Classification Search
CPC ......... H04L 67/10; H04L 47/10; H04L 47/70; G06F 9/466; G06F 9/50; G06F 16/951
(Continued)

(56) References Cited

U.S. PATENT DOCUMENTS 7,933,962 B1    4/2011   Banerjee et al.
8,386,425 B1 *  2/2013   Kadayam ............ G06F 11/2064
                                                 707/613
(Continued)

OTHER PUBLICATIONS

U.S. Appl. No. 16/921,490, "Non-Final Office Action", dated Oct. 15, 2021, 6 pages.
(Continued)

*Primary Examiner* — Hamza N Algibhah
(74) *Attorney, Agent, or Firm* — Invoke

(57) ABSTRACT

Techniques for managing network-accessible infrastructure metadata are provided. A method includes receiving a resource request comprising resource metadata corresponding to a network-accessible infrastructure resource, determining whether to commit the resource request based at least in part on a constraint associated with the network-accessible infrastructure resource, and, in accordance with a determination to commit the resource request: generating, by the computer system, a resource identifier describing resource metadata in accordance with the resource request, storing, by the computer system, the resource metadata in a data store in communication with the computer system, receiving, by the computer system, a data request to provide the resource metadata described by the resource identifier, and providing, by the computer system, the resource metadata described by the resource identifier in accordance with the data request.

17 Claims, 12 Drawing Sheets

(51) Int. Cl.
*G06F 9/50* (2006.01)
*G06F 9/54* (2006.01)
*G06F 16/951* (2019.01)
*H04L 29/06* (2006.01)
*H04L 47/10* (2022.01)
*H04L 47/70* (2022.01)
*H04L 67/10* (2022.01)

(58) Field of Classification Search
USPC .......................................................... 709/226
See application file for complete search history.

(56) References Cited

U.S. PATENT DOCUMENTS

| | | | | |
|---|---|---|---|---|
| 8,386,433 | B1* | 2/2013 | Kadayam | G06F 16/273 |
| | | | | 707/646 |
| 9,559,928 | B1* | 1/2017 | Porter | G06F 11/3624 |
| 10,135,708 | B2* | 11/2018 | Dinan | H04L 43/10 |
| 10,318,491 | B1 | 6/2019 | Graham et al. | |
| 10,318,896 | B1 | 6/2019 | Sarkar et al. | |
| 10,469,330 | B1 | 11/2019 | Roth et al. | |
| 11,016,946 | B1 | 5/2021 | Graham et al. | |
| 2005/0021708 | A1 | 1/2005 | Raghuraman et al. | |
| 2008/0005505 | A1* | 1/2008 | Maegawa | H04N 5/76 |
| | | | | 711/E12.001 |
| 2008/0201409 | A1 | 8/2008 | Vul et al. | |
| 2012/0151063 | A1 | 6/2012 | Yang et al. | |
| 2014/0201202 | A1 | 7/2014 | Jones et al. | |
| 2014/0214772 | A1* | 7/2014 | Kadayam | H04L 67/1095 |
| | | | | 707/655 |
| 2017/0078409 | A1 | 3/2017 | Yazir et al. | |
| 2017/0134520 | A1 | 5/2017 | Abbasi et al. | |
| 2018/0063089 | A1 | 3/2018 | Moysi et al. | |
| 2018/0137208 | A1* | 5/2018 | Ricker | H04N 21/8586 |
| 2018/0375712 | A1* | 12/2018 | Kröhling | H04L 67/563 |
| 2019/0034482 | A1 | 1/2019 | Werner et al. | |
| 2019/0394096 | A1 | 12/2019 | Bernat et al. | |
| 2020/0143011 | A1 | 5/2020 | Kaplan et al. | |
| 2021/0081451 | A1* | 3/2021 | Wong | G06F 16/958 |
| 2021/0117722 | A1 | 4/2021 | Kal et al. | |
| 2021/0133721 | A1* | 5/2021 | Ponceleon | G06Q 20/29 |

OTHER PUBLICATIONS

U.S. Appl. No. 16/921,490, "Notice of Allowance", dated Nov. 3, 2021, 8 pages.

* cited by examiner

CENTRALIZED APPROACH FOR MANAGING CROSS-SERVICE DATA OF CLOUD RESOURCES

CROSS REFERENCES TO RELATED APPLICATIONS

This continuation application claims the benefit and priority of U.S. application Ser. No. 16/921,490, filed Jul. 6, 2020, entitled "CENTRALIZED APPROACH FOR MANAGING CROSS-SERVICE DATA OF CLOUD RESOURCES," the entire contents of which is incorporated herein by reference for all purposes.

BACKGROUND

Cloud-based platforms provide scalable and flexible computing resources for users. Such cloud-based platforms, also referred to as infrastructure as a service (IaaS), may offer entire suites of cloud solutions around a customer's data, for example, solutions for authoring transformations, loading data, and presenting the data.

Cross-service data is collected as part of managing cloud resource allocation, management, and infrastructure planning. The process of data collection may involve contacting each cloud service individually and aggregating cross-service data from service-specific data. For example, resource utilization data for multiple cloud services for a given IaaS client typically involves requesting resource metadata from each service, which individually tracks and accumulates resource metadata, and then aggregating the data from the multiple cloud services to provide a unified report. Such techniques may be computationally expensive, and may involve significant computational overhead for redundant data collection systems, as well as complicated processes at the point of report generation.

BRIEF SUMMARY

Techniques are provided (e.g., a method, a system, non-transitory computer-readable medium storing code or instructions executable by one or more processors) for centralized management of cross-service data of cloud resources in a single data management service.

In certain embodiments, a method includes receiving, by a computer system, a resource request comprising resource metadata corresponding to a network-accessible infrastructure resource, determining, by the computer system, whether to persist the resource request based at least in part on a constraint associated with the network-accessible infrastructure resource, and, in accordance with a determination to persist the resource request, persisting the resource request to a downstream service, generating, by the computer system, a request identifier describing resource metadata in accordance with the resource request, and storing, by the computer system, the request identifier in a data store in communication with the computer system. The method also includes receiving, by the computer system, a data request to provide resource metadata described by the request identifier, and providing, by the computer system, the resource metadata described by the request identifier in accordance with the data request.

Optionally, generating the request identifier includes storing the resource request in the data store as an in-progress request, the in-progress request comprising a pre-defined timeout period, fetching, in response to a fetch request or after the pre-defined timeout period is elapsed, the in-progress request from the data store, requesting a resource status associated with the in-progress request, receiving the resource status corresponding to the network-accessible infrastructure resource identified in the resource metadata, and reconciling the in-progress request with the resource status.

Optionally, reconciling the in-progress request with the resource status includes ascertaining a lease token value associated with the in-progress request and, in accordance with the lease token value being true, releasing the in-progress request to the data store or, in accordance with the lease token value being false, assigning the in-progress request to a default queue of a reconciler instance.

Optionally, reconciling the in-progress request includes, in accordance with the resource status indicating an active status, committing the resource request.

Optionally, the predefined timeout is a first predefined timeout, and wherein reconciling the in-progress request comprises, in accordance with the resource status indicating an in-progress status, rescheduling the resource request after a second predefined timeout, wherein the in-progress status comprises at least one of creating, terminating, or updating.

Optionally, reconciling the in-progress request includes, in accordance with the resource status indicating a terminated status, aborting the resource request, at least in part by removing the resource request from the data store.

Optionally, determining whether to persist the resource request includes receiving a resource usage corresponding to the resource request, determining a quota limit for the resource request based at least in part on the resource metadata, determining whether the resource usage exceeds the quota limit, and, in accordance with a determination that the resource usage does not exceed the quota limit, persisting the resource request.

In certain embodiments, a computer system includes one or more processors and a memory in communication with the one or more processors, the memory configured to store computer-executable instructions, wherein executing the computer-executable instructions causes the one or more processors to perform one or more of the steps of the method described above.

In certain embodiments, a computer-readable storage medium stores computer-executable instructions that, when executed, cause one or more processors of a computer system to perform one or more steps of the method described above.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Such cloud-based platforms, also referred to as infrastructure as a service (IaaS) may offer entire suites of cloud solutions around a customer's data, for example solutions for authoring transformations, loading data, and presenting the data. A holistic approach to managing cross-service data may reduce computational overhead dedicated to service-specific resource usage data management, for example, by centralizing metadata tracking in a cross-service metadata management system. In place of making multiple resource metadata requests to multiple different cloud-services, a single metadata request is made to the cross-service metadata management system, which provides cross-service data from a central database.

Figure 1:
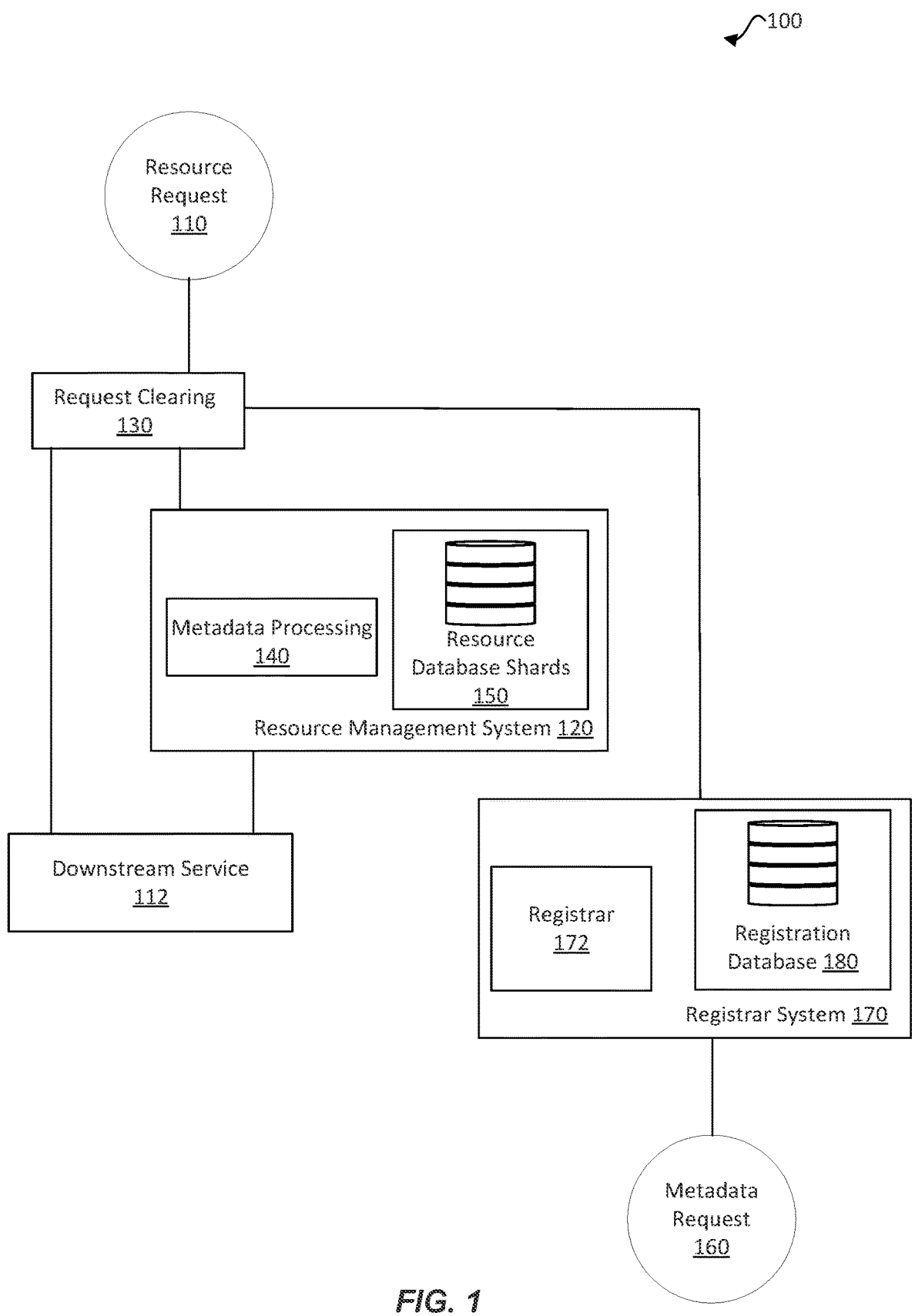
FIG. 1 illustrates an example system for managing cross-service data of cloud resources, in accordance with one or more embodiments.

FIG. 1 illustrates an example system 100 for managing cross-service data of cloud resources, in accordance with one or more embodiments. As illustrated, the system 100 includes multiple system elements interposed between a resource request 110, for example, as generated by a customer of an IaaS service, and a downstream service 112 that will provide the IaaS service. In some embodiments, the additional system elements include a resource management system 120, including request clearing 130, metadata processing 140, and one or more resource database shards 150. The resource request 110, in this example, includes a request for allocating a cloud-service resource, including, but not limited to, computation resources, cloud storage, object storage, network resources, or the like.

In the example illustrated, the request clearing 130 receives the resource request 110, and tracks and/or generates resource usage metadata that is passed to the metadata processing 140 (e.g., a request identifier). The request clearing 130 also persists the resource request 110 to the downstream service 120 to execute the request, as described in more detail in reference to FIG. 2, below. In some embodiments, the request clearing 130 also determines and/or enforces limiting rules associated with the resource request 110. Limiting rules may include a resource usage quota (or other limit and/or constraint) associated with the type of resource that is the subject of the resource request 110. In some embodiments, the metadata processing 140 is called by the request clearing 130 to validate the resource request 110, as described in reference to FIG. 2, below.

In some embodiments, quotas are set on a compartment level, where compartments are logical containers instituted to organize and control access to cloud-service resources (e.g., computation resources, cloud storage, object storage, network resources, load balancers, virtual cloud networks, etc.). Compartments may be organized in levels, where upper-level compartments manage lower level compartments, according to identity and access management resources.

The request clearing 130 may act as an entry point for calling application programming interfaces (APIs) of platform services. As such, the request clearing 130 may determine whether the resource request 110 violates the resource usage quota, and in some cases may pass the resource request 110 to the downstream service 112 for implementation. Additionally, the request clearing may send and/or persist metadata associated with the resource request 110 to the metadata processing 140, as part of generating and/or tracking resource usage by the downstream service 112.

While the example system 100 illustrated describes a single resource request 110 for a single downstream service 112, the resource management system 120 may accommodate and/or process multiple resource requests for multiple resources and resource types intended for multiple downstream services. In some embodiments, the resource request 112 may specify one resource. In some embodiments, a cloud IaaS system may implement multiple instances of the resource management system 120 in a geographical region.

In the example system 100, the metadata associated with the resource request 110 is stored and/or persisted by the metadata processing 140 in the resource database shards 150. The resource database shards 150 may include block volume storage, object storage, or the like. The metadata processing 140 may manage input and output (I/O) operations with respect to updating and/or processing resource metadata stored in the resource database shards 150.

The metadata associated with the resource request 110, including the type of request, the type and identifier of resource (referred to as "resource identifier" below), as well as other characteristics of the resource request 110, are stored in the resource database shards 150. In some embodiments, the resource database shards 150 store data including, but not limited to, resource metadata, resource usage, descriptive information for each resource request 110 (e.g., a unique request identifier), as well as the type of request (e.g., requests to move a resource from one compartment to another compartment, requests to modify either a usage quota for a specific resource, etc.). In some embodiments, the resource database shards 150 also store tenancy quota usage, which may include aggregate data at the compartment and the tenancy level, and which may be used when updating resource metadata usage records for provision to external requestors. In some embodiments, the resource metadata may include information describing the availability domain of the downstream resource, where the availability domain may correspond to a data center or the IaaS infrastructure in a given physical location.

In some embodiments, the resource metadata from the resource request 110 that is stored and/or persisted by the metadata processing 140 includes, but is not limited to, a unique resource identifier, a compartment identifier to locate the compartment containing the resource addressed by the resource request 110, a resource status that indicates whether a resource should be counted for quota usage (e.g., whether the resource has been attributed to the downstream service 112). In some embodiments, the resource status may be described by one or more states including, but not limited to, creating, active, updating, terminated, or the like. In some embodiments, a resource is described by a single resource status at a time. For example, at a first time, a resource may be described by a creating status and, at a second time, the resource may be described by an active status. In some cases, terminated resource status metadata may indicate that the associated resource need not be counted for quota usage. In some cases, the request clearing 130 may retrieve resource status metadata for determining whether to persist the resource request 110 (e.g., passing on the resource request 110 to the downstream service 112). For example, the request clearing 130 may limit persist operations to resource requests 110 for which the resource status indicates that the resource is not subject to another request that is still acting on the resource (also referred to as an "in-progress" request). In some embodiments, the corresponding resource status is an active status, as opposed to updating or terminated statuses. In some embodiments, updating status may indicate that the resource usage is increasing or decreasing, in which case the request clearing 130 may use the maximum possible resource quota when determining whether the resource request 110 violates any constraints on the resource.

In some embodiments, the resource metadata also includes one or more elements to optimize database operations, which may, in turn, reduce demand on computational resources dedicated to the metadata processing 140 and metadata management. For example, the resource metadata may include, but is not limited to, an identifier of the last transaction to act on the resource subject to the resource request 110. In this way, rather than searching a table of requests arranged in chronological order, a search of the resource database shards 150 may specify the last transaction identifier to directly surface the request information for that resource. Additionally and/or alternatively, the resource metadata may include timestamp information to reflect the time at which, for example, the resource was created, the resource was modified and/or updated, etc.

The resource management system 120 may collect resource usage metadata, including, but not limited to, a resource identifier, a quota identifier, a quota family (e.g., compute), a current usage of the quota, or locator information (e.g., a tenancy identifier).

The resource management system 120 may collect request metadata for the resource request 110, including, but not limited to, a unique request identifier, a resource identifier on which the request is acting, a time at which the request was created (e.g., for tracking purposes), a time at which the metadata processing may start reconciling the request (discussed in more detail below), a request type, a request status, the identity of the originator of the resource request 110, etc. In some embodiments, the request type may include, but is not limited to, a create request (for assigning a resource), a terminate request (for de-assigning a resource), a move request associated with moving a resource within and/or between systems (e.g., from one compartment to another compartment), a modify usage request (for increasing or decreasing usage of the associated resource), etc. In some embodiments, the request status, as described in more detail in reference to the forthcoming figures, may include, but is not limited to, an in-progress status (reflecting that the request has not been resolved by the downstream service 112), or that the request is either committed, aborted, or reconciling (to indicate that it is in-process by a reconciler instance as described in more detail in reference to FIG. 5, below).

Figure 5:
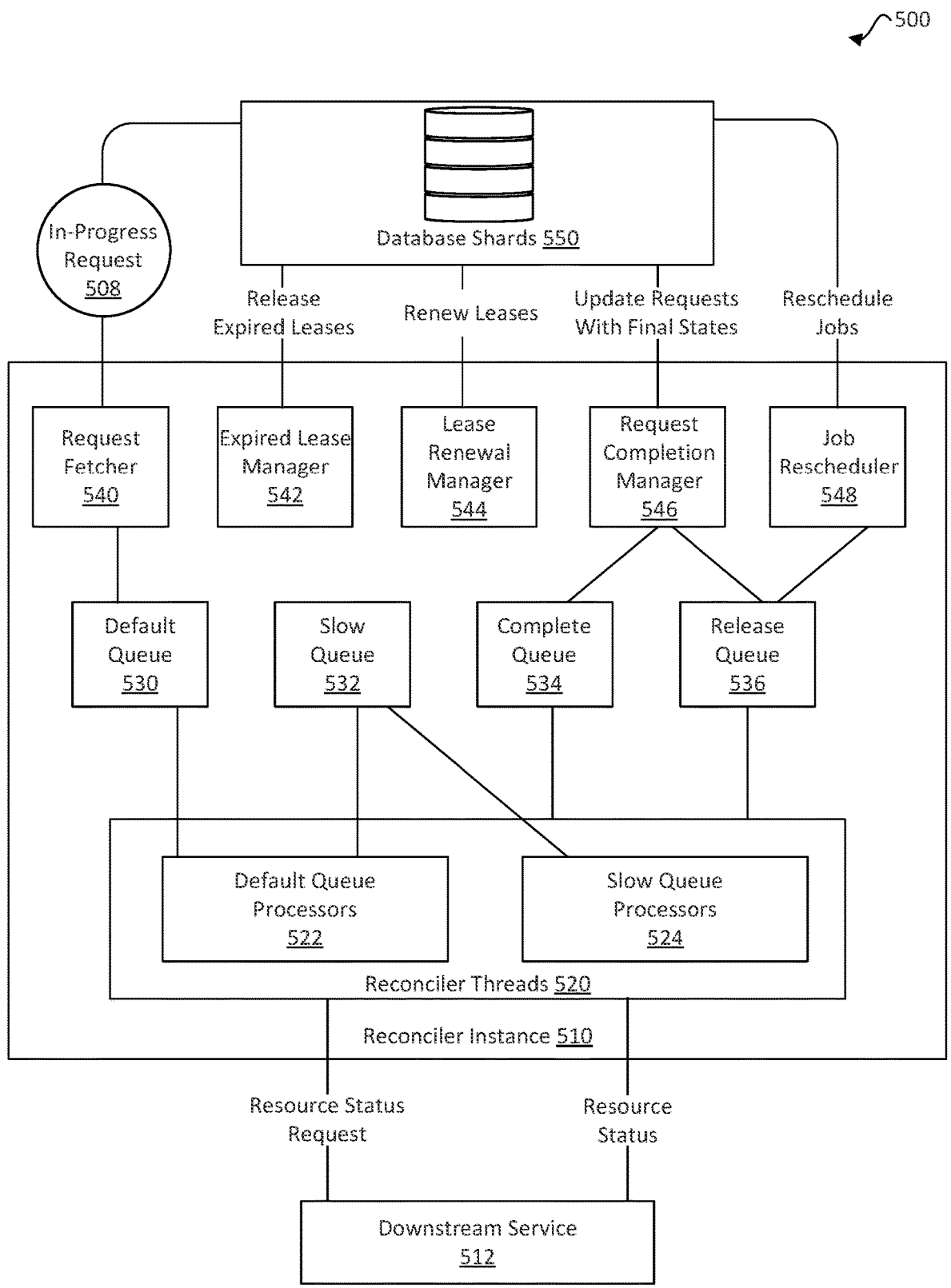
FIG. 5 illustrates an example system for reconciling in-progress requests with resource statuses of cloud resources, in accordance with one or more embodiments.

As described in more detail in reference to FIG. 5, the metadata processing 140 may update metadata associated with the resource request 110 by using a reconciler instance. The reconciler instance may permit the metadata processing 140 to maintain updated resource metadata in the resource database shards 150, at least in part by requesting resource state information from the downstream service 112. Once provided with the resource state information (also referred to as resource status) the metadata processing 140 may update the request status and resource status in the database shards 150 to reflect the resource state information, to maintain the metadata stored in the resource database shards 150 and/or to permit the request clearing 130 to determine whether to persist subsequent resource requests addressing the same resource to the downstream service 112 (e.g., in a system where only a single request may act on a resource at a time, such that the request clearing will not persist a resource request until there are no other pending requests acting on the resource).

In the illustrated example system 100, the resource management system 120 is in communication with a registrar system 170, including a registrar 172 and a registration database 180. In some embodiments, the registrar system 170 stores resource quota metadata, including, but not limited to, resource-type usage data. As an example, resource-type usage data may describe general usage for resources of one or more types. For example, a compute resource of a first type may use four cores and 4 GB of memory, for which corresponding information is stored in the registration database 180. By contrast, actual resource usage for specific cases may be stored in the resource database shards 150. In response to a metadata request 160 made to the registrar system 170 on the part of the request clearing 130, the registrar system 170 may provide corresponding resource-type metadata to the resource clearing 130. In some embodiments, the registrar 172 executes and/or manages multiple metadata requests 160 from multiple instances of the resource management system 120 by aggregating resource-type metadata in the registration database 180. As an example, the metadata request 160 may include a request for resource-type usage data to compare against a quota limit included as part of a resource request. As such, the registrar system 170 may provide the requested data to the corresponding resource management system from the registration database 180. As mentioned above, the resource management system 120 may execute multiple resource requests for a corresponding number of downstream services. In this way, the registrar system 170 may, in some cases, be able to respond multiple metadata requests by communicating with the resource clearing elements, rather than with a large number of downstream services, each processing metadata individually. Similarly, multiple instances of the resource management system 120 may be implemented in a region, such that the registrar system 170 may access multiple resource management systems as an intermediate metadata management layer rather than the service level directly.

Implementing the resource management system 120 provides central metadata management for cross-service data. In this way, the request clearing 130 and the metadata processing 140 may take the place of service-specific data management systems, which may reduce the number, in the IaaS system, of redundant metadata management systems. As such, the metadata processing 140, being implemented in a resource management system along with the request clearing 130, provides a single platform for holistic metadata management. The example system 100, as illustrated, may reduce redundancy and overhead, and may improve performance of resource metadata management systems implemented in IaaS networks. For example, by managing cross-service data in a centralized system, which is also integrated into request clearing, resource usage metadata can be aggregated and tracked via a central avenue for resource request submission. The centralized approach provides a holistic manner of tracking resource metadata that may reduce and/or eliminate the necessity for multiple redundant resource tracking processes that are not integrated with resource clearing, which implicates additional resource status tracking procedures that may be redundant with existing resource clearing processes. Process integration in this manner may reduce operational overhead in terms of computational efficiency, the latency of metadata resource tracking system response to inbound metadata requests, and/or the number of parallel resource tracking subsystems needed to process resource usage data.

Figure 2:
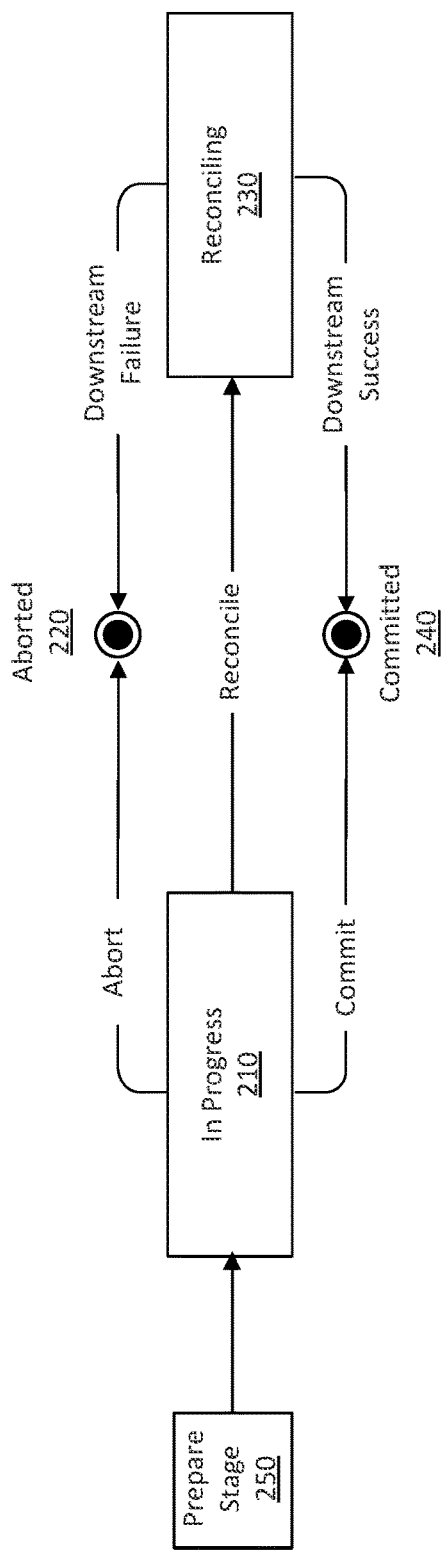
FIG. 2 illustrates an example request state diagram for managing resource requests, in accordance with one or more embodiments.

FIG. 2 illustrates an example request state diagram 200 for managing resource requests, in accordance with one or more embodiments. As described above, the resource request (e.g., resource request 110 of FIG. 1) is associated with metadata that describe its properties, including the request status. As illustrated, the request status includes, but is not limited to, an in-progress status 210, an aborted status 220, a reconciling status 230, and a committed status 240. Each request status corresponds to a status of the entire request, and is associated with different stages of the request. In some embodiments, the treatment of the request has two main stages, including, but not limited to, a request preparation stage (e.g., prepare stage), and a request completion stage.

In some embodiments, a metadata processing system (e.g., metadata processing 140 of FIG. 1) ensures, as part of the request preparation stage, that the resource request does not violate any constraints (such as quota limits, described above). In some embodiments, where the resource request does not violate any constraints, and/or the resource that is the subject of the request is not already subject to a pending request, the prepare stage 250 may be completed, with the resource request advancing to the request completion stage. As illustrated, before the resource request has been confirmed or retracted, the resource request has the in-progress status 210. Disposition of the resource request (e.g., either successful/or unsuccessful execution) will modify the request status to either the committed status 240 for a successful execution, or the aborted status 220 for an unsuccessful execution. In the context of the request state diagram 200, the request status refers to metadata in the resource management system (e.g., resource management system 120 of FIG. 1), as reported to the metadata processing system.

In some embodiments, a resource request is validated and completes the prepare stage 250, but remains in the in-progress status 210 without execution (e.g., does not have a status-change to committed status 240 or aborted status 220) within a predefined period of time. The predefined period of time may be the time at which the metadata processing may start reconciling the request, and may be included in request metadata received as part of the resource request. If the metadata processing starts reconciling, the resource request will modify the request status to the reconciling status 230, which will be reflected in request metadata (e.g., in the resource database shards) until the reconciling completes. Following reconciliation, if the resource request was successfully executed (e.g., downstream success), the request status is changed to the committed status 240. Corresponding to an unsuccessful execution following reconciling (e.g., downstream failure), the request status is changed to the aborted status 220.

Figure 3:
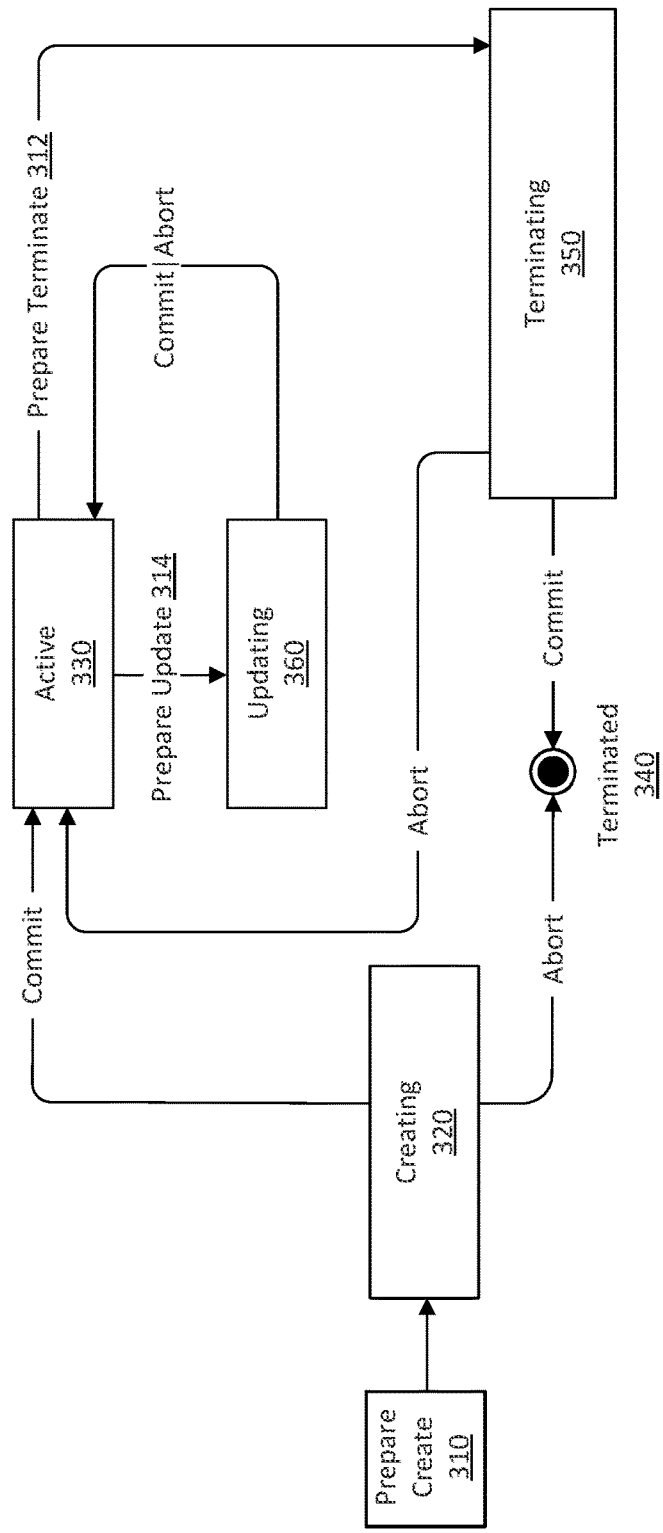
FIG. 3 illustrates an example resource state diagram for managing cross-service data of cloud resources, in accordance with one or more embodiments.

FIG. 3 illustrates an example resource state diagram 300 for managing cross-service data of cloud resources, in accordance with one or more embodiments. As described in more detail in reference to the resource metadata included in the resource request (e.g., resource request 110 of FIG. 1), the resource subject to the resource request is described by a resource status, the different stages of which are illustrated in FIG. 3. As described in reference to FIG. 2, a prepare stage 310 includes validating, by the resource management system (e.g., resource management system 120 of FIG. 1), that the resource request does not violate any constraints on the resource (e.g., downstream resource 112 of FIG. 1), the resource request advances to the completion stage. In some embodiments, when the resource management system persists the resource request to the downstream resource, the metadata processing system (e.g., metadata processing 140 of FIG. 1) modifies the status of the resource to a creating status 320. While FIG. 3 describes the creating status 320, all request types (e.g., create, move, terminate, modify) are similarly described by the resource state diagram 300 illustrated in FIG. 3. For example, the creating status 320 describes the status of the downstream resource for a create-type request before a commit/abort decision has occurred. In some cases, a move request is a sub-type of a modify request, and as such is only applicable to active resources (e.g., a move request cannot be addressed to resources not having an active resource status).

When the downstream service has confirmed to the resource management system that the request action (e.g., creating a compute instance) has been executed, the resource status is changed to an active status 330, which applies while the downstream resource is in use and/or until the resource has been the subject of another prepare request (e.g., prepare terminate-type) and corresponds to a committed status for the corresponding resource request (committed status 240 of FIG. 2). In some embodiments, when the create-type request is aborted (e.g., aborted status 220 of FIG. 2) the resource status is modified from the creating status 320 to the terminated status 340. As illustrated in FIG. 3, the terminated status 340 is shown as an exit point from the resource state diagram 300. In some embodiments, a terminated resource cannot be modified to the active status 330 via a subsequent create-type resource request. By contrast, a terminating status can revert to active status when a pending terminate request is aborted.

While in the active status 330, subsequent resource requests may modify the resource status, for example, terminate-type requests, update usage-type requests, or the like. For terminate-type requests, the prepare terminate stage 312, similarly to the prepare create stage 310, includes validating the terminate-type request by the resource management system, such that the resource request is advanced to the completion stage, wherein the resource status is modified to a terminating status 350. If the terminate-type request is committed, the resource status is changed to the terminated status, whereas if the terminate-type request is aborted, the resource status is returned to the active status.

Similar to the terminate-type request, the update-type request is accompanied by a transition to an updating status 360 after concluding a prepare update stage 314. Update-type requests may include modifying usage of the resource and, as such, may involve determining whether the request violates a usage quota on the resource. As shown in FIG. 3, the update-type request does not lead to the terminate status 340, but rather returns the resource to the active status 330. In some embodiments, update-type requests modify the usage or location of the resource (e.g., move-type request), rather than allocating or de-allocating the resource.

As described in more detail in reference to the following figures, a reconciler may interrogate the downstream service after a pre-defined timeout while the resource has the creating status 320, the terminating status 350, and/or the updating status 360. In some embodiments, a reconciler instance acts to update and track requests that have not completed the completion stage within a pre-defined time, which may allow better resource tracking and metadata management with reduced operational cost.

Figure 4:
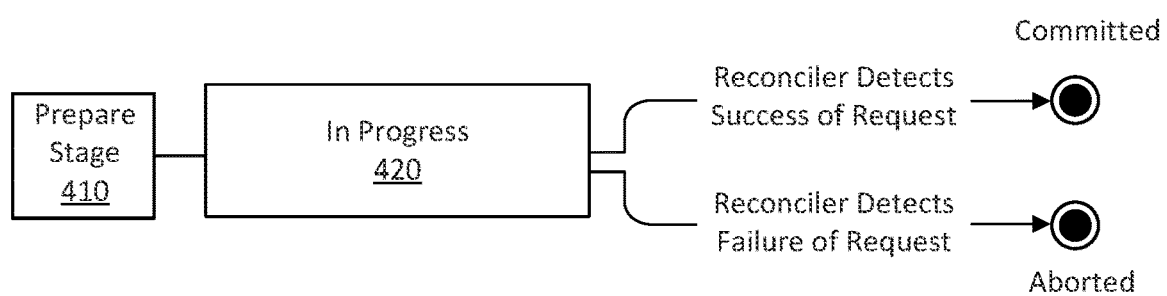
FIG. 4 illustrates an example request state diagram for managing in-progress resource requests by a reconciler, in accordance with one or more embodiments.

FIG. 4 illustrates an example request state diagram 400 for managing in-progress resource requests by a reconciler, in accordance with one or more embodiments. As described above, the resource management system (e.g., resource management system 120 of FIG. 1) may call a reconciler instance in response to a request having an in-progress status 420 for a time exceeding a pre-defined timeout period, provided, for example, as part of the resource request (e.g., resource request 110 of FIG. 1).

As illustrated, the request completes a prepare stage 410 upon validation that the request does not violate any constraints on the resource. In cases where the request is advanced to the completion stage, the request status is changed to the in progress status 420 in a metadata database (e.g., resource database shards 150 of FIG. 1). After the pre-defined timeout period has elapsed, the reconciler instance detects, for example by requesting the request status and/or the resource status from the downstream service (e.g., downstream service 112 of FIG. 1). In some embodiments, when the reconciler instance detects that the request has been executed successfully, the resource management system (e.g., metadata processing 140 of FIG. 1) changes the request status to "committed" in the metadata database. Similarly, if the reconciler instance detects that the request did not successfully execute (e.g., the request failed, was rejected, etc.), the request status is changed to aborted in the metadata database. In this way, the resource management system maintains and updates the metadata database in situations where resource requests are persist to the downstream service but the result of the request is not provided within the pre-defined timeout period.

FIG. 5 illustrates an example system 500 for reconciling in-progress requests with resource statuses of cloud resources, in accordance with one or more embodiments. As described above, the resource management system (e.g., resource management system 120 of FIG. 1) may implement a reconciler to update an in-progress request 508 for which the pre-defined timeout period has elapsed. In some embodiments, the system implements a reconciler instance 510 to fetch the in-progress request 508 from one or more database shards 550. Once fetched, the request status may be modified to indicate that the request is reconciling (e.g., reconciling status 230 of FIG. 2) The reconciler instance 510 processes request metadata by one or more reconciler threads 520, including, for example, one or more default queue processors 522 and one or more slow queue processors 524.

When called, the illustrated reconciler instance 510 implements a request fetcher 540 to place the in-progress request 508 in a default queue 530. where it is processed in sequence by the default queue processors 522. The default queue 530 may be ordered, for example, by request creation time (e.g., a timestamp included in request metadata), and/or by time remaining in the pre-defined timeout period of the in-progress request 508. The request fetcher 540 may fetch multiple requests periodically, and may implement a strategy to balance processing across the database shards 550, for example, by fetching requests from a random shard, or by cycling through the database shards 550 according to a cycle pattern.

As part of reconciliation, the reconciler instance 510 may implement a lease system to manage resource request processing, such that the in-progress request 508 is only fetched by a single reconciler instance 510. The request fetcher 540 may implement logic when fetching requests. For example, the request fetcher 540 may fetch requests having in-progress status, for which a reconciler lease token has not yet been issued. Once identified, the in-progress request 508 is issued a reconciler lease token identified with an identifier of the reconciler instance 510. In some embodiments, the reconciler lease token is a Boolean value that indicates whether a reconciler instance 510 has already fetched the in-progress request 508. In some embodiments, the reconciler lease token includes one or more unique identifiers to provide fault tolerance in the reconciler lease system. For example, the lease token may include a unique ID of the reconciler instance and a start time of the reconciler instance. As such, if the reconciler instance fails, the restart time will be included in all tokens issued by the restarted instance. In this way, tokens issued by the earlier reconciler instance will have a token that predates the restarted instance and may be freed by an expired lease manager 542. By implementing the lease system, the in-progress request 508 is only processed by a single reconciler instance at a time, thereby permitting multiple reconciler instances to operate in parallel while potentially avoiding redundancy and conflict. Leases may be limited to a set lease duration (e.g., a lease renewal period).

In some cases, when a request has not been processed before the lease duration expires, the reconciler instance 510 may implement an expired lease manager 542 and/or a lease renewal manager 544. In some embodiments, the reconciler may fail to reconcile an in-progress request, for example, if the reconciler instance 510 experiences a failure, leaving one or more requests in the reconciling status. The expired lease manager 542 may find requests for which the status indicates reconciliation is underway by the reconciler instance 510, but the lease token indicates that the lease duration has elapsed. Such leases may be released, including modifying the request status stored in the database shards 550 and retracting the lease token, thereby freeing the in-progress request 508 to be fetched for reconciliation again. Similarly, the lease renewal manager 544 may detect a request for which the status indicates that reconciliation is underway with the reconciler instance 510, and may renew the lease if the lease token indicates it was issued recently. For example, the lease token may include an indication of the time the token was issued, such that the lease renewal manager 544 may determine if the lease token issued after the most recent recovery of the reconciler instance 510 from a failure. In such cases, the lease renewal manager 544 may renew leases for which the lease token was issued after the most recent recovery, and may determine that other leases, including those for which the lease token was issued before the most recent recover, are expired.

In some embodiments, the downstream service 512 is unresponsive or does not communicate with the reconciler instance 510 rapidly, and the in-progress request is transferred to a slow queue 532 from the default processor 522. Implementing the slow queue 532 may permit the reconciler instance 510 to reduce average wait times in the default queue 530. Requests in the slow queue 532 may be sent to the slow queue processors 524.

Processing an in-progress request 508, as described in reference to FIG. 4, above, includes requesting resource status from the downstream service 512 by the reconciler threads 520. In response, the downstream service 512 provides the status of the resource addressed by the in-progress request 508. In accordance with the returned resource status, the reconciler threads 520 dispose of the in-progress request by directing it to a complete queue 534 or a release queue 536. In some embodiments, the complete queue 534 organizes requests for which the resource status indicates a complete completion stage, as described in reference to FIGS. 2-4, above. In such cases, the request is sent to a request completion manager 546, which updates requests with final states and resources with updated statuses in the database shards 550, as described in more detail in reference to FIGS. 2-4 above. In some embodiments, the request completion manager 546 may return a request to the release queue 536. The release queue 536, as described below, releases requests to the job re-scheduler 548.

In some embodiments, the reconciler instance 510 does not complete reconciliation of the in-progress request 508 (e.g., the resource status does not indicate whether the request is committed or aborted) within a number of attempts. The number of attempts may include, but is not limited to a number of times a downstream service has been contacted for resource status information, a maximum number of retrials, a maximum period of time for the reconciler instance 510 to reconcile the in-progress request 508, or the like. In such cases, the request may be sent to the release queue 536 and processed by a job re-scheduler 548. The job re-scheduler 548 may release the in-progress request 508 by updating the status of the in-progress request 508 to allow another reconciler instance to fetch and process (e.g., retracting the lease token, modifying the status from reconciling to in-progress).

Figure 6:
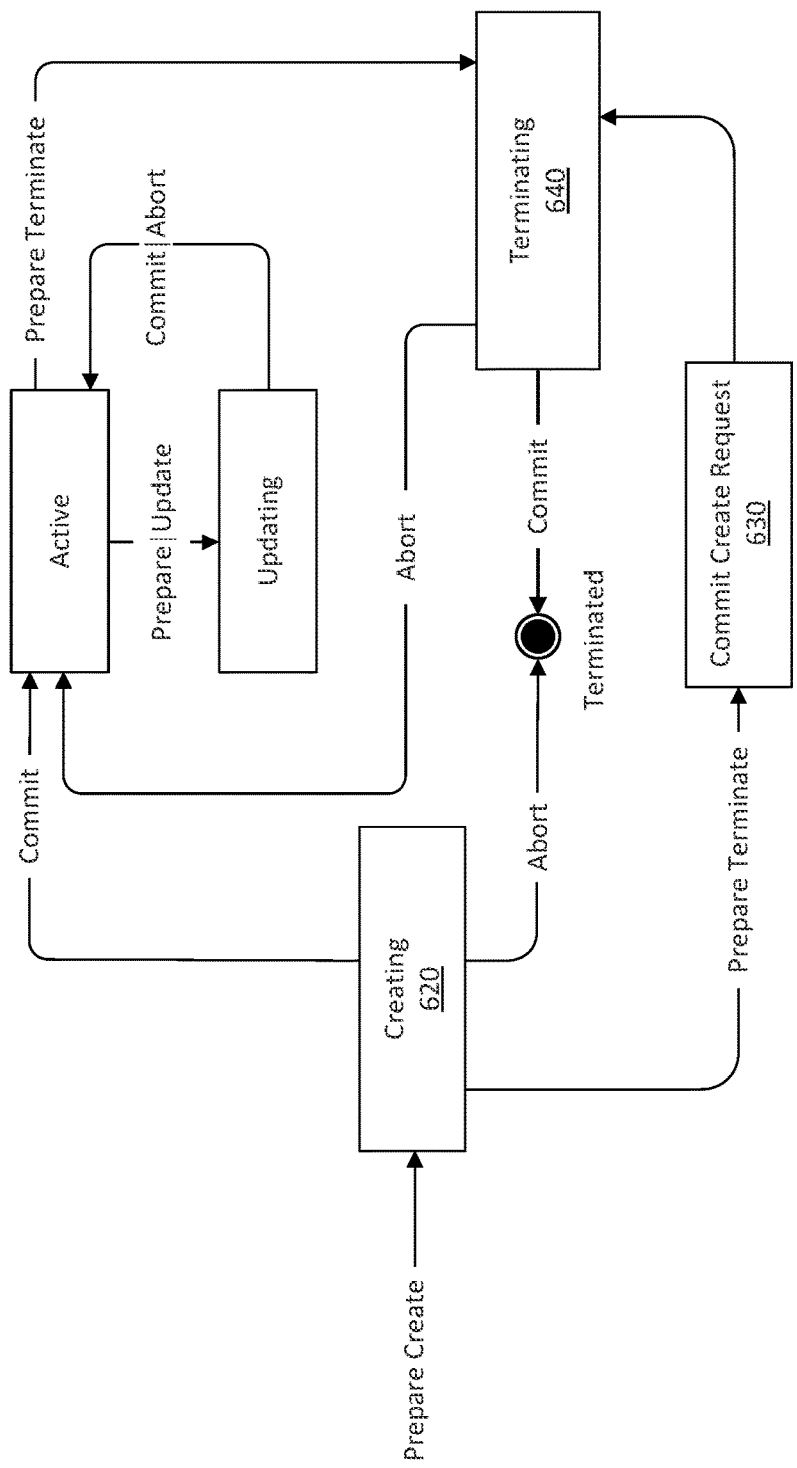
FIG. 6 illustrates an example resource state diagram for managing cross-service data of cloud resources under a provisioning state, in accordance with one or more embodiments.

FIG. 6 illustrates an example resource state diagram 600 for managing cross-service data of cloud resources under a provisioning state, in accordance with one or more embodiments. As described in more detail in reference to FIG. 3, in some embodiments, a resource request (e.g., resource request 110 of FIG. 1) may not address a resource unless the resource is not already the subject of another active request. In some cases, the resource may only be targeted by a single resource request at a time, to prevent multiple resource requests being addressed to the same resource concurrently. Request clearing (e.g., request clearing 130 of FIG. 1) may implement such limitations, by checking for an in-progress request status (e.g., in-progress status 210 of FIG. 2) and thereafter terminate the prepare stage of any request that is pending. In-progress requests may, however, sometimes be subject of a terminate-type request while still in-progress with a create-type request. In some embodiments, these two types of requests are incompatible, and a terminate-type request cannot address a resource that is in-progress with a create-type request.

In some embodiments, the request may be terminated while it is still under a provisioning state (e.g., before being completed). In such cases, as illustrated in FIG. 6, a resource in the creating status 620 may be subject to a terminate-type request, as well as from the active status (e.g., active status 330 of FIG. 3). The terminate-type request may resolve the create-type request (e.g., modify the creating status 620) directly, while committing the terminate-type request and updating the resource status to the terminating status 640. In some embodiments, an update and/or modify-type request may similarly be terminated by a terminate-type request.

Figure 7:
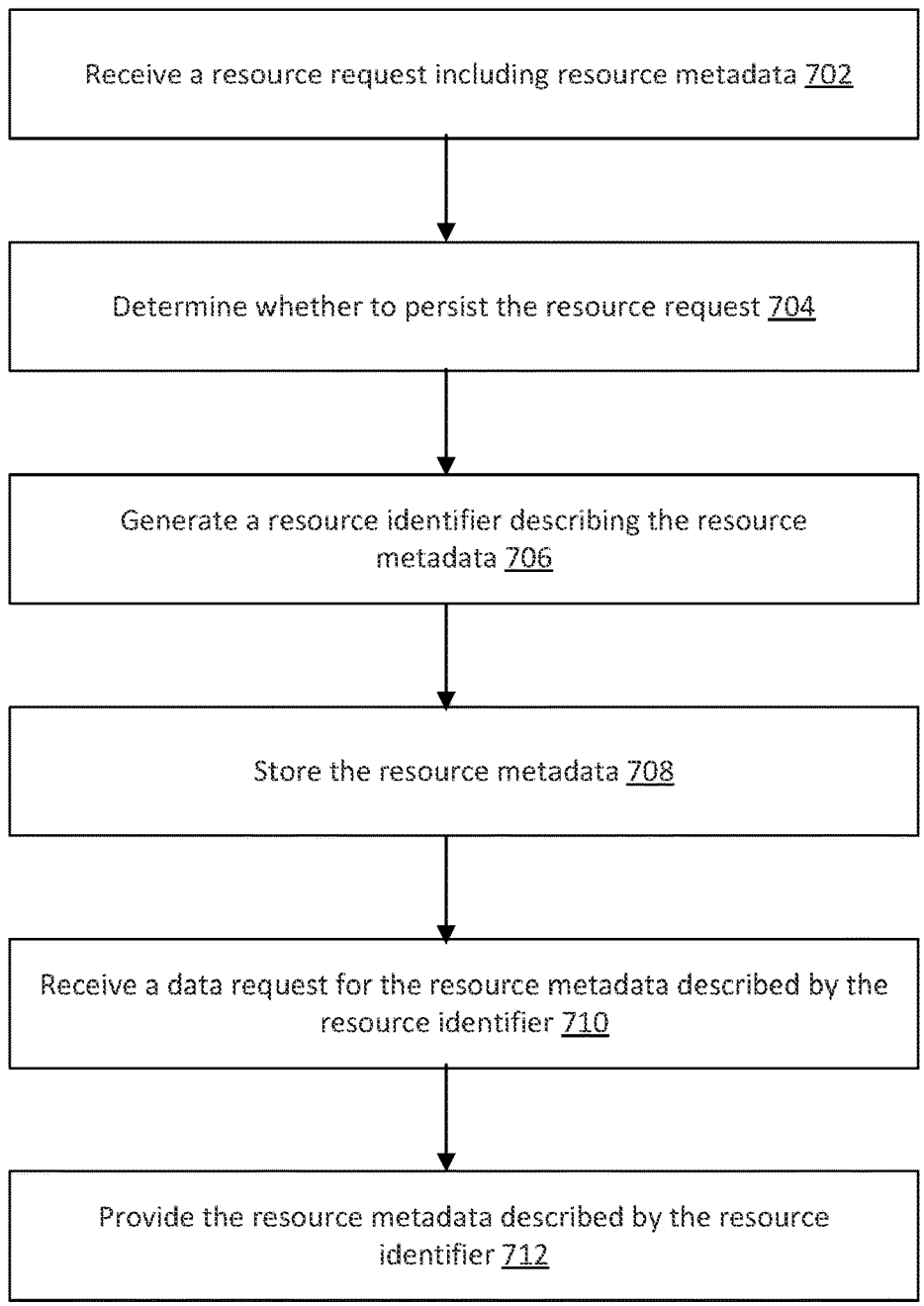
FIG. 7 illustrates an example flow for managing cross-service data of cloud resources, in accordance with one or more embodiments.

FIG. 7 illustrates an example flow 700 for managing cross-service data of cloud resources, in accordance with one or more embodiments. The operations of the flow can be implemented as hardware circuitry and/or stored as computer-readable instructions on a non-transitory computer-readable medium of a computer system, such as the resource management system 120 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 700 includes an operation 702, where the computer system receives a resource request including resource metadata. As described in more detail in reference to FIG. 1, above, the resource management system (e.g., resource management system 120 of FIG. 1) may receive a resource request from a client and/or customer of an IaaS system (e.g., resource request 110 of FIG. 1) addressed to a downstream service (e.g., downstream service 112 of FIG. 1).

In an example, the flow 700 includes an operation 704, where the computer system determines whether to persist the resource request. As part of managing cross-service resource metadata, the resource management system may implement one or more steps, as part of a prepare stage, to validate the resource request. As described in more detail in reference to FIG. 2, the prepare stage may include determining a usage quota as part of request metadata, and compare it to a quota limit. Determining whether to persist the request may include determining the resource status of the resource subject to the resource request. For example, in some embodiments, a resource may only be the subject of a resource request when it is not already subject to a pending request. If the computer system determines that the resource is not subject to a pending request and that the request does not violate any resource limits, it may persist the request to the downstream service.

In an example, the flow 700 includes an operation 706, where the computer system generates a resource identifier describing resource metadata. In accordance with a determination to persist the resource request to the downstream service, the computer system generates the identifier to track and manage a request status and a resource status, and to indicate that the request is pending on the resource. As described in more detail in reference to FIGS. 2-3, the request status may include an in-progress status and the resource status may include a pending status reflecting the type of resource request being made. For example, the resource status may be a creating status (e.g., creating status 320 of FIG. 3) for a create-type request, a terminating status (e.g., terminating status 350 of FIG. 3) for a terminate-type request, or an updating status (e.g., updating status 360 of FIG. 3) for modifying usage, moving, or other types of requests that do not change the resource from an active status after being committed or aborted (e.g., active status 330 of FIG. 3).

In an example, the flow 700 includes an operation 708, where the computer system stores the resource metadata described by the resource identifier. As described in more detail in reference to FIG. 1, the resource management system may include a data store (e.g., resource database shards 150 of FIG. 1) that is configured to store resource metadata and request metadata, to be used by the resource management system in managing cross-service resource metadata. For example, the resource metadata includes resource tracking data, allowing the resource management system to maintain a holistic view of utilization of network infrastructure by services in a compartment, as described above, in reference to FIG. 1.

In an example, the flow 700 includes an operation 710, where the computer system receives a data request for resource metadata. The data request may be received from an external service that uses cross-service usage data to track resource usage at one or more levels of a distributed computing system. For example, the data request may include a request for resource usage data on a compartment level, on a region level, etc. Similarly, the data request may include a request for resource-type usage data, or usage data for multiple resource types, as well as for metadata based on request identifiers to track upstream requestors of downstream service resources.

In an example, the flow 700 includes an operation 712, where the computer system provides the resource metadata described by the resource identifier. In accordance with the data request, the resource management system provides the specific data to the originator of the metadata request. In so doing, the resource management system acts as a central management system for cross-service resource tracking data, rather than requiring the originator of the metadata request to collect metadata from individual downstream services on an ongoing basis. By combining metadata processing with request clearing, as described in reference to FIG. 1, the resource management system centralizes data management, which may reduce overhead and computational requirements associated with resource tracking.

Figure 8:
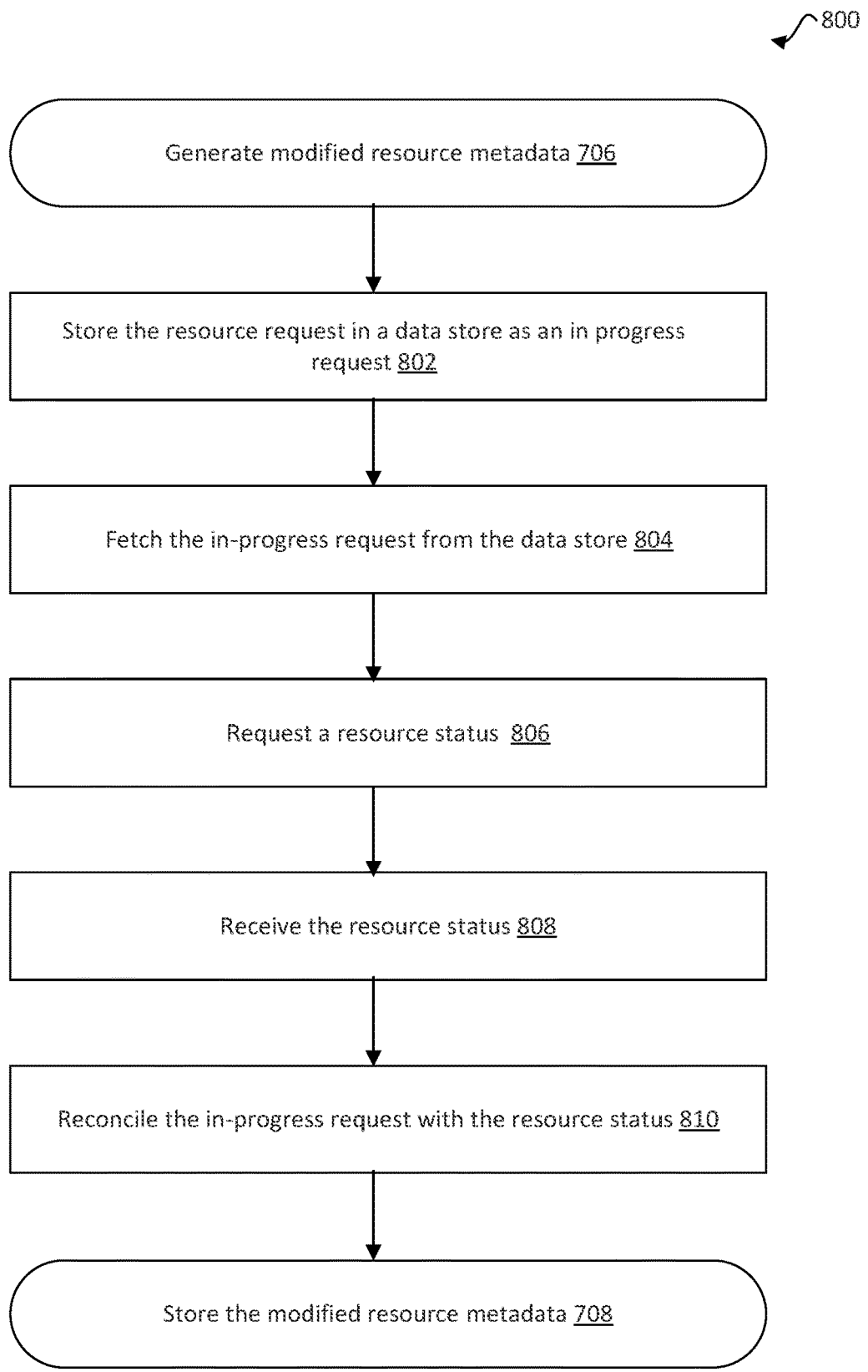
FIG. 8 illustrates an example flow for handling modification requests for cross-service data of cloud resources, in accordance with one or more embodiments.

FIG. 8 illustrates an example flow 800 for handling modification requests for cross-service data of cloud resources, in accordance with one or more embodiments. The operations of the flow can be implemented as hardware circuitry and/or stored as computer-readable instructions on a non-transitory computer-readable medium of a computer system, such as the resource management system 120 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

The example flow 800 illustrates an example of the reconciliation procedure, as described in more detail in reference to FIGS. 4-5, by which the resource management system (e.g., resource management system 120 of FIG. 1) reconciles the final status of a resource request (e.g., resource management system 110 of FIG. 1), and the corresponding resource, after initially persisting the resource request to the downstream service (e.g., downstream service 112 of FIG. 1). In this way, generating modified resource metadata (e.g., generating modified resource metadata 706 of FIG. 7), as described in reference to FIG. 7, may include additional operations, described below.

In an example, the flow 800 includes an operation 802, where the computer system stores the resource request in a data store as an in-progress request. As described in more detail in reference to FIGS. 4-5 in-progress requests are those for which the request has been validated by the resource management system, completing a prepare stage, but have not yet been committed or aborted by the downstream service, or, in some cases, a reconciler process is scheduled but has not yet occurred. Until such time as the resource request is disposed, the request status is in-progress, and the resource status is a pending status corresponding to the request-type (e.g., create, terminate, modify). As part of the resource request metadata, a pre-defined timeout period determines whether the resource management system will abort the request, for example, if the request is not accepted within the timeout period. If the request is accepted, but still in-progress, a reconciliation may be scheduled for a later time, using the reconciler system (e.g., reconciler instance 510 of FIG. 5).

In an example, the flow 800 includes an operation 804, where the computer system fetches the in-progress request from the data store. As described in more detail in reference to FIG. 5, the pre-defined timeout may identify whether a resource request is a candidate for being fetched by a reconciler instance from the database shards. For example, the reconciler system may refer to request metadata indicating that the pre-defined timeout period has elapsed prior to fetching the in-progress request. In some embodiments, a reconciler instance may fetch an in-progress request before the timeout period has elapsed, but in such cases may be limited to reschedule actions rather than abort. In a reconciliation method implemented to prevent conflict between multiple reconciler instances, the reconciler system may implement a token-based lease method to limit reconciliation of an in-progress request to a single reconciler at a time. The token system is described in more detail in reference to FIG. 5.

In an example, the flow 800 includes an operation 806, where the computer system requests a resource status. In some embodiments, the computer system requests the resource status from the downstream resource for the in-progress request. Fetched requests are processed in a queue, such that one or more reconciler threads (e.g., reconciler threads 520 of FIG. 5) process requests that are fetched in groups from the data store (e.g., database shards 550 of FIG. 5).

In an example, the flow 800 includes an operation 808, where the computer system receives the resource status. The response from the downstream service is a current resource status corresponding to the fetched in-progress request. The reconciler makes a determination of the request outcome (e.g., committed, aborted, in-progress). In some embodiments, when the resource status indicates that the request remains in-progress (e.g., a pending status), the reconciler may reschedule the request for a subsequent fetching by another reconciler instance (e.g., via release queue 536 and job reschedule 548 of FIG. 5).

In an example, the flow 800 includes an operation 810, where the computer system reconciles the in-progress request with the resource status. As described in more detail in reference to FIG. 9, below, the reconciler system modifies the request status in the data store to reflect the resource status received from the downstream service. In this way, the metadata database may maintain an up-to-date registry of resource usage across services in a compartment, in a central database.

Figure 9:
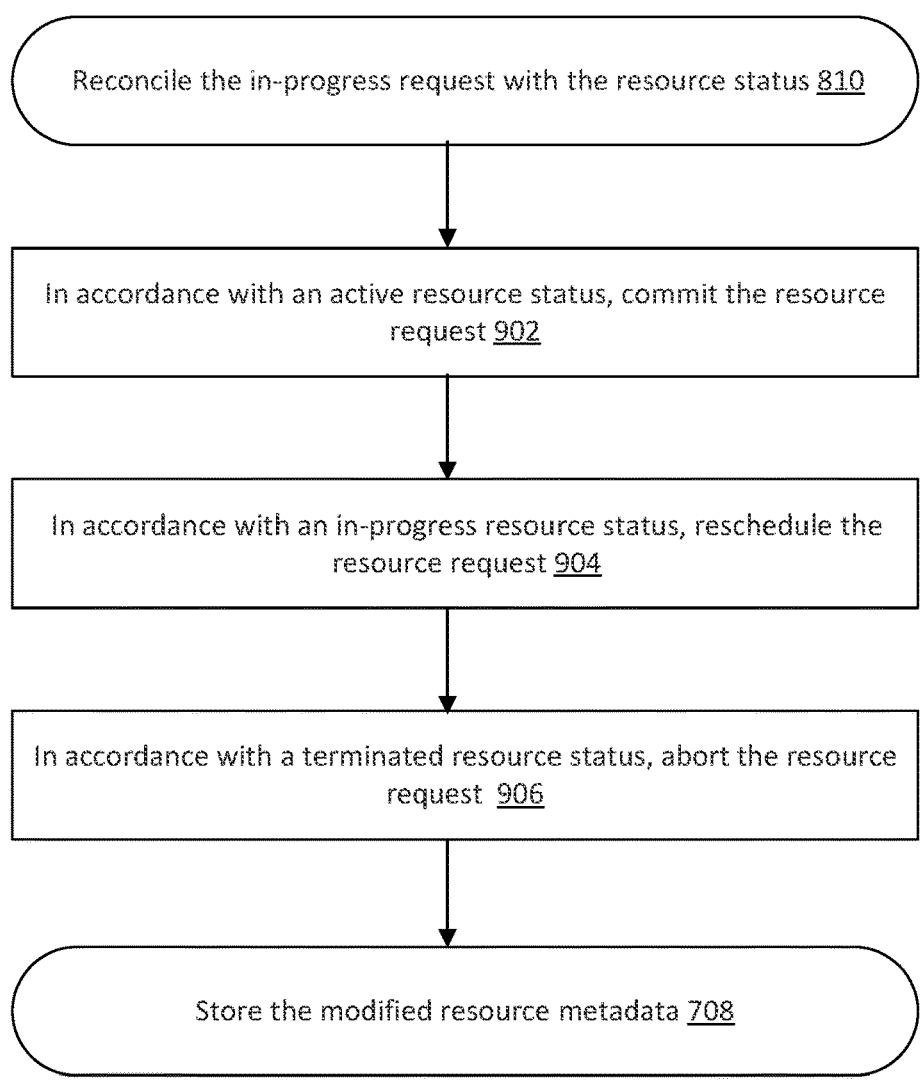
FIG. 9 illustrates an example flow for managing cross-service data of cloud resources, in accordance with one or more embodiments.

FIG. 9 illustrates an example flow 900 for managing cross-service data of cloud resources, in accordance with one or more embodiments. The operations of the flow can be implemented as hardware circuitry and/or stored as computer-readable instructions on a non-transitory computer-readable medium of a computer system, such as the resource management system 120 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

The example flow 900 illustrates another example of the reconciliation procedure, as described in more detail in reference to FIGS. 4-5, by which the resource management system (e.g., resource management system 120 of FIG. 1) reconciles the final status of a resource request (e.g., resource management system 110 of FIG. 1), and the corresponding resource, after initially persisting the resource request to the downstream service (e.g., downstream service 112 of FIG. 1). In this way, reconciling the in-progress request with the resource status (e.g., operation 810 of FIG. 8), as described in reference to FIG. 8, may include additional operations, described below.

In an example, the flow 900 includes an operation 902, where the computer system, in accordance with an active resource status, commits the resource request. As described in more detail in reference to FIGS. 4-5, the reconciler (e.g., reconciler instance 510 of FIG. 5) requests and receives resource status data corresponding to a fetched in-progress request, and reconciles the request status with the resource status. When the resource status indicates (e.g., by an active status) that the request was committed by the downstream service, the reconciler modifies the request status in a metadata database to indicate it has been committed. The resource status, similarly, is stored to provide reconciled resource usage data.

In an example, the flow 900 includes an operation 904, where the computer system, in accordance with an in-progress resource status, reschedules the resource request. In contrast to operation 902, in cases where the downstream service has not resolved the in-progress request, as indicated by a resource status corresponding to an in-progress request (e.g., creating, terminating, updating, etc.), the reconciler may reschedule the request for another reconciliation at a later time. This may include releasing the request, including releasing the lease of the request by the reconciler (e.g., expired lease manager 542 of FIG. 5), and rescheduling the reconciliation (e.g., job reschedule 548 of FIG. 5).

In an example, the flow 900 includes an operation 906, where the computer system, in accordance with a terminated resource status, aborts the resource request. Finally, in some cases, the resource status indicates that the request was aborted by the downstream service (e.g., terminated status), in which case the reconciler may update the request ID metadata to reflect that the request was aborted, and that the resource is no longer active or pending. In some embodiments, this permits the resource to be the subject of another resource request (e.g., resource request 110 of FIG. 1). As described above in reference to FIGS. 7-8, following reconciliation of the request with the resource status, the modified resource metadata is stored in the data store (e.g., resource database shards 150 of FIG. 5).

Correspondingly, in reference to terminate-type requests, the computer system may reconcile the resource status with the in-progress request. In some embodiments, for in-progress terminate quests, the computer system may abort the in-progress request when the downstream service reports an active resource status. In this way, the reconciler instance implements the reconciliation in accordance with the resource status affirming or contradicting the in-progress request (e.g., a terminate-type request is aborted when the resource status is active, a terminate type is committed when the resource status is terminated, etc.).

Figure 10:
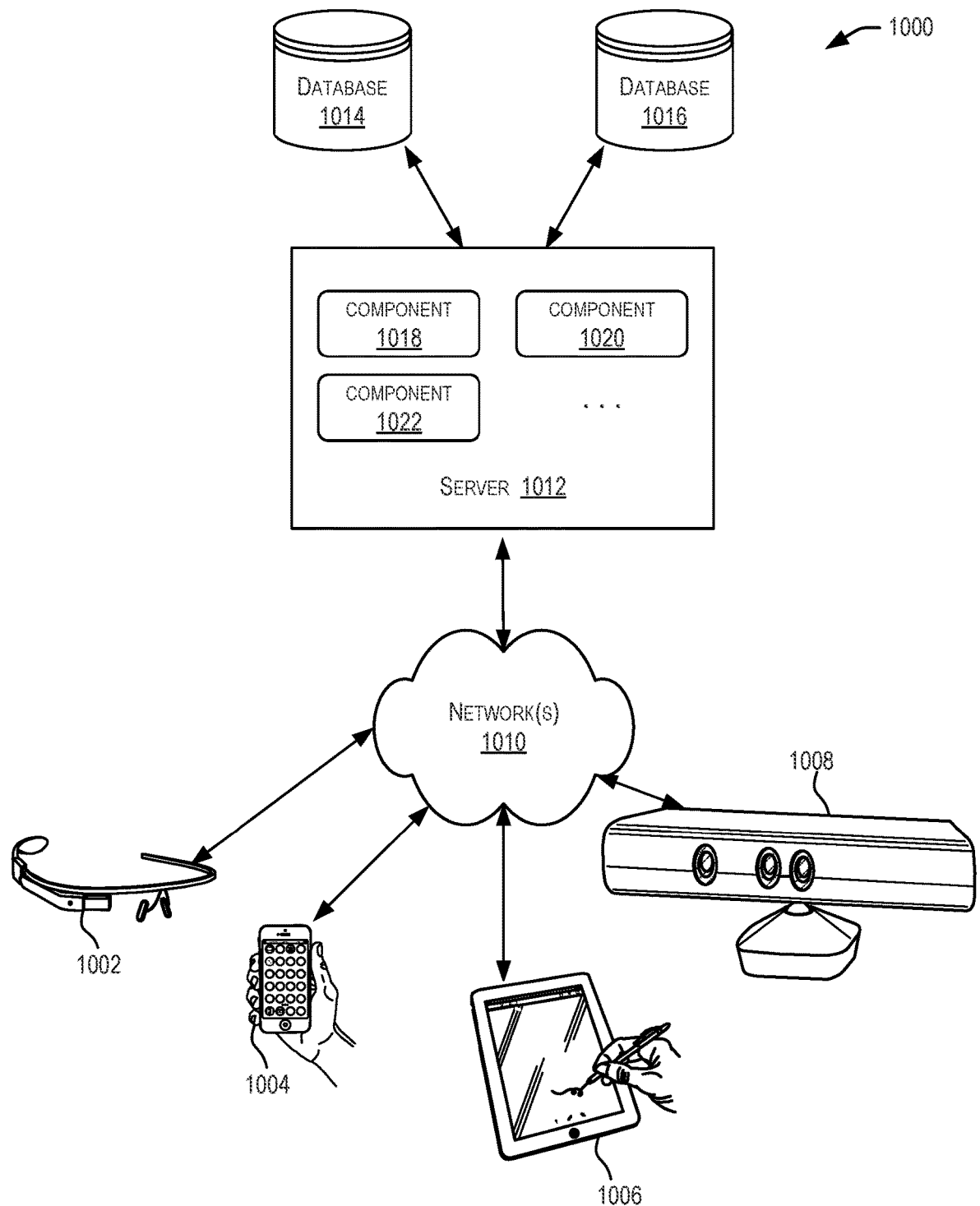
FIG. 10 depicts a simplified diagram of a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 602.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
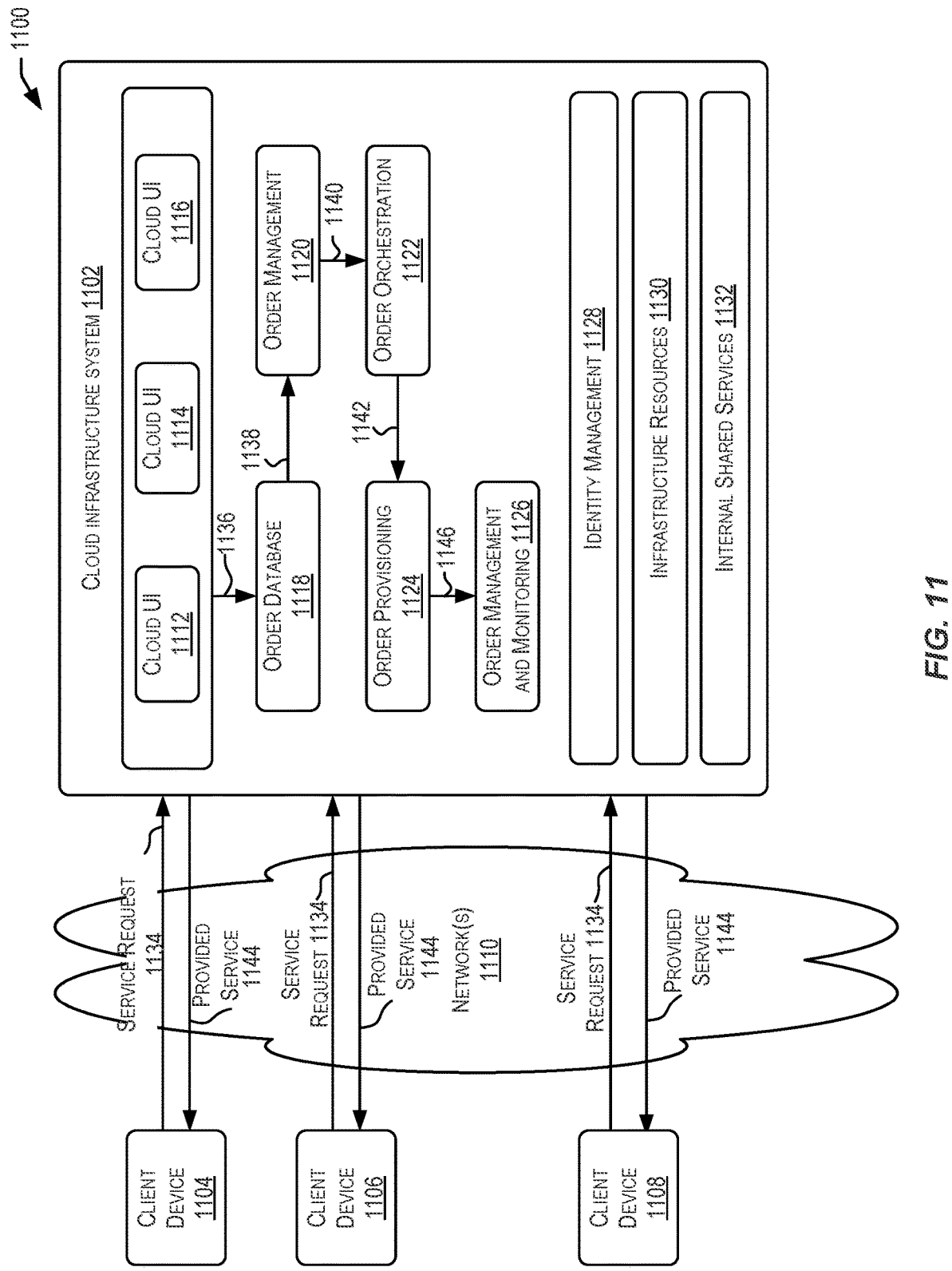
FIG. 11 is a simplified block diagram of one or more components of a system environment by which services provided by one or more components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the disclosure. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
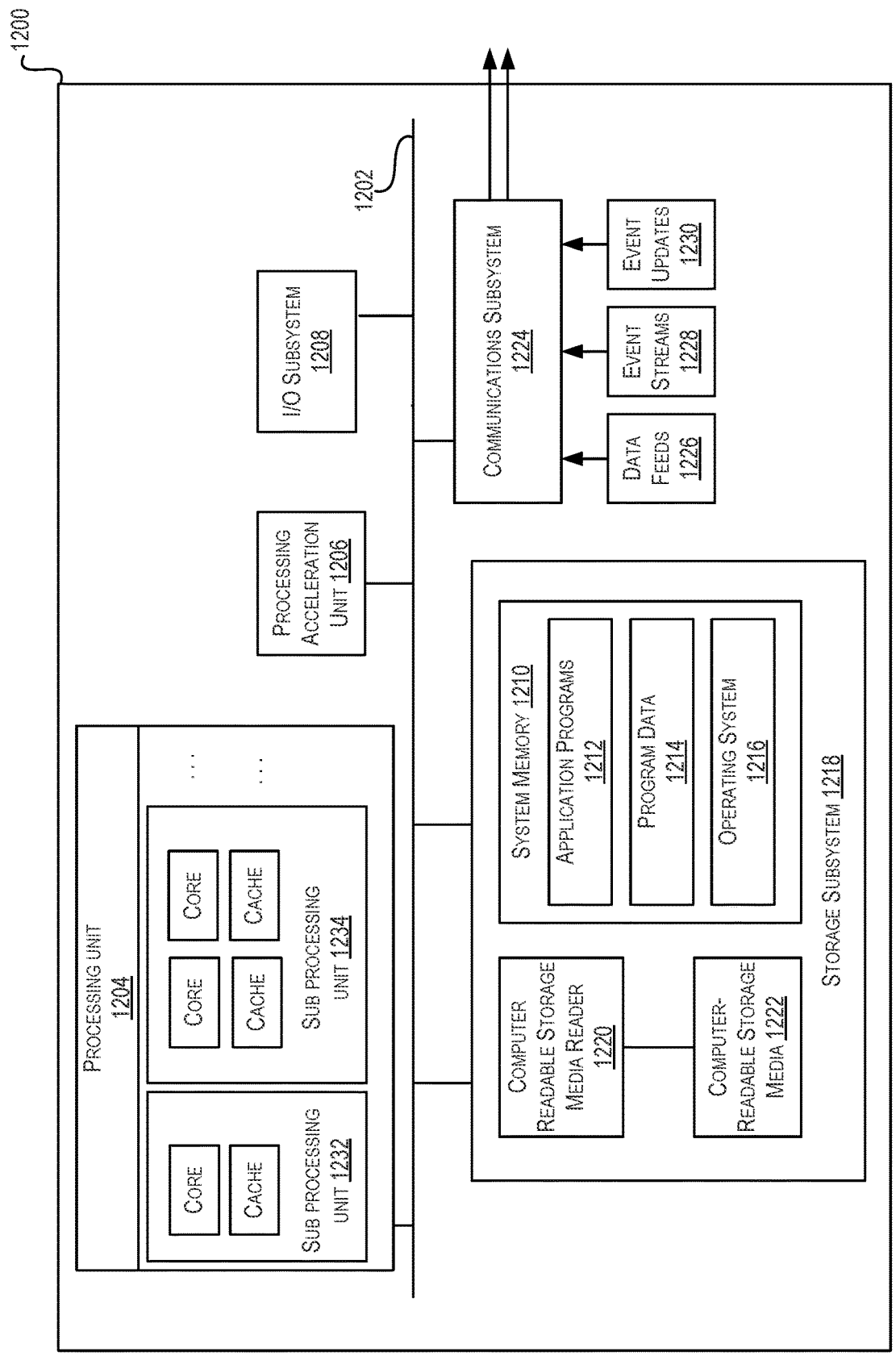
FIG. 12 illustrates an exemplary computer system, in which various embodiments of the present disclosure may be implemented.

FIG. 12 illustrates an exemplary computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Some companies have various cloud services for Sales, Service, Human Capital Management and Talent, and on-premise enterprise systems like Fusion, Enterprise Business Systems (EBS), PeopleSoft or JDE. Some offer Enterprise Business Intelligence Application services in the cloud that deploy a data warehouse and reporting system.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   receiving, by a computer system, a resource request comprising resource metadata corresponding to a network-accessible infrastructure resource;
   determining, by the computer system, that the resource request is to be persisted based at least in part on a constraint associated with the network-accessible infrastructure resource
   wherein determining that the resource request is to be persisted comprises:
      receiving a resource usage corresponding to the resource request;
      determining a quota limit for the resource request based at least in part on the resource metadata;
      determining whether the resource usage exceeds the quota limit; and
      in accordance with a determination that the resource usage does not exceed the quota limit, persisting the resource request;

generating, by the computer system, a request identifier describing the resource metadata in accordance with the resource request;

receiving, by the computer system, a data request to provide the resource metadata described by the request identifier; and providing, by the computer system, the resource metadata described by the request identifier in accordance with the data request.

2. A method, comprising:

receiving, by a computer system, a resource request comprising resource metadata corresponding to a network-accessible infrastructure resource;

determining, by the computer system, that the resource request is to be persisted based at least in part on a constraint associated with the network-accessible infrastructure resource;

generating, by the computer system, a request identifier describing the resource metadata in accordance with the resource request, wherein generating the request identifier comprises:

storing the resource request in a data store as an in-progress request, the in-progress request comprising a pre-defined timeout period;

fetching, in response to a fetch request or after the pre-defined timeout period is elapsed, the in-progress request from the data store;

requesting a resource status associated with the in-progress request;

receiving the resource status corresponding to the network-accessible infrastructure resource identified in the resource metadata; and reconciling the in-progress request with the resource status receiving, by the computer system, a data request to provide the resource metadata described by the request identifier; and providing, by the computer system, the resource metadata described by the request identifier in accordance with the data request.

3. The method of claim 2, wherein reconciling the in-progress request with the resource status comprises:

ascertaining a lease token value associated with the in-progress request; and in accordance with the lease token value being true, releasing the in-progress request to the data store; or in accordance with the lease token value being false, assigning the in-progress request to a default queue of a reconciler instance.

4. The method of claim 2, wherein reconciling the in-progress request comprises, in accordance with the resource status indicating an active status, committing the resource request.

5. The method of claim 2, wherein the predefined timeout is a first predefined timeout, and wherein reconciling the in-progress request comprises, in accordance with the resource status indicating an in-progress status, rescheduling the resource request after a second predefined timeout, wherein the in-progress status comprises at least one of creating, terminating, or updating.

6. The method of claim 2, wherein reconciling the in-progress request comprises, in accordance with the resource status indicating a terminated status, aborting the resource request, at least in part by removing the resource request from the data store.

7. A computer system, comprising:

a memory configured to store computer-executable instructions; and one or more processors configured to access the memory and execute the computer-executable instructions to at least:

receive a resource request comprising resource metadata corresponding to a network-accessible infrastructure resource;

determine that the resource request is to be persisted based at least in part on a constraint associated with the network-accessible infrastructure resource wherein determining that the resource request is to be persisted comprises:

receiving a resource usage corresponding to the resource request;

determining a quota limit for the resource request based at least in part on the resource metadata;

determining whether the resource usage exceeds the quota limit; and in accordance with a determination that the resource usage does not exceed the quota limit, persisting the resource request;

generate a request identifier in accordance with the resource request;

receive a data request to provide the resource metadata described by the request identifier; and provide the resource metadata described by the request identifier in accordance with the data request.

8. A computer system, comprising:

a memory configured to store computer-executable instructions; and one or more processors configured to access the memory and execute the computer-executable instructions to at least:

receive a resource request comprising resource metadata corresponding to a network-accessible infrastructure resource;

determine that the resource request is to be persisted based at least in part on a constraint associated with the network-accessible infrastructure resource;

generate a request identifier in accordance with the resource request;

wherein generating the request identifier comprises:

storing the resource request in a data store as an in-progress request, the in-progress request comprising a pre-defined timeout period;

fetching, in response to a fetch request or after the pre-defined timeout period is elapsed, the in-progress request from the data store;

requesting a resource status associated with the in-progress request;

receiving the resource status corresponding to the network-accessible infrastructure resource identified in the resource metadata; and reconciling the in-progress request with the resource status receive a data request to provide the resource metadata described by the request identifier; and provide the resource metadata described by the request identifier in accordance with the data request.

9. The computer system of claim 8, wherein reconciling the in-progress request comprises, in accordance with the resource status indicating a committed status, committing the resource request.

10. The computer system of claim 8, wherein reconciling the in-progress request comprises, in accordance with the resource status indicating an in-progress status, rescheduling the resource request after a second predefined timeout.

11. The computer system of claim 8, wherein reconciling the in-progress request comprises, in accordance with the resource status indicating an aborted status, aborting the resource request, at least in part by removing the resource request from the data store.

12. The computer system of claim 7, wherein the resource metadata comprises at least one of a resource identifier, a compartment identifier, an availability domain, a resource kind, a resource status, a last transaction identifier, or a tenancy identifier.

13. A non-transitory computer-readable storage medium, storing computer-executable instructions that, when executed by a computer system, cause one or more processors of a computer system to perform operations comprising:
  receiving, by the computer system, a resource request comprising resource metadata corresponding to a network-accessible infrastructure resource;
  determining, by the computer system, that the resource request is to be persisted based at least in part on a constraint associated with the network-accessible infrastructure resource
  wherein determining that the resource request is to be persisted comprises:
    receiving a resource usage corresponding to the resource request;
    determining a quota limit for the resource request based at least in part on the resource metadata;
    determining whether the resource usage exceeds the quota limit; and
    in accordance with a determination that the resource usage does not exceed the quota limit, persisting the resource request;
  generating, by the computer system, a resource identifier describing the resource metadata in accordance with the resource request;
  receiving, by the computer system, a data request to provide the resource metadata described by the resource identifier; and
  providing, by the computer system, the resource metadata described by the resource identifier in accordance with the data request.

14. A non-transitory computer-readable storage medium, storing computer-executable instructions that, when executed by a computer system, cause one or more processors of a computer system to perform operations comprising:
  receiving, by the computer system, a resource request comprising resource metadata corresponding to a network-accessible infrastructure resource;
  determining, by the computer system, that the resource request is to be persisted based at least in part on a constraint associated with the network-accessible infrastructure resource;
  generating, by the computer system, a resource identifier describing the resource metadata in accordance with the resource request,
  wherein generating the resource identifier comprises:
    storing the resource request in the data store as an in-progress request, the in-progress request comprising a pre-defined timeout period;
    fetching, in response to a fetch request or after the pre-defined timeout period is elapsed, the in-progress request from the data store;
    requesting a resource status associated with the in-progress request;
    receiving the resource status corresponding to the network-accessible infrastructure resource identified in the resource metadata; and
    reconciling the in-progress request with the resource status
  receiving, by the computer system, a data request to provide the resource metadata described by the resource identifier; and
  providing, by the computer system, the resource metadata described by the resource identifier in accordance with the data request.

15. The non-transitory computer-readable storage medium of claim 14, wherein reconciling the in-progress request comprises, in accordance with the resource status indicating a committed status, committing the resource request.

16. The non-transitory computer-readable storage medium of claim 14, wherein reconciling the in-progress request comprises, in accordance with the resource status indicating an in-progress status, rescheduling the resource request after a second predefined timeout.

17. The non-transitory computer-readable storage medium of claim 14, wherein reconciling the in-progress request comprises, in accordance with the resource status indicating an aborted status, aborting the resource request, at least in part by removing the resource request from the data store.

* * * * *